(12) United States Patent
Pitt et al.

(10) Patent No.: US 6,576,412 B1
(45) Date of Patent: Jun. 10, 2003

(54) HYDROPHILIC COLLOID COMPOSITION

(75) Inventors: Alan R. Pitt, Herts (GB); David D. Miller, Billerica, MA (US); Andrew Howe, Herts (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/868,210

(22) PCT Filed: Dec. 22, 1999

(86) PCT No.: PCT/GB99/04221

§ 371 (c)(1),
(2), (4) Date: Jun. 14, 2001

(87) PCT Pub. No.: WO00/37396

PCT Pub. Date: Jun. 29, 2000

(30) Foreign Application Priority Data

Dec. 22, 1998 (GB) .............................................. 9828156

(51) Int. Cl.⁷ ............................. G03C 1/00; G03C 7/26; G03C 7/32
(52) U.S. Cl. ........................ 430/546; 430/539; 430/631; 430/642; 430/643; 430/637
(58) Field of Search .................................. 430/546, 539, 430/631, 642, 637, 643

(56) References Cited

U.S. PATENT DOCUMENTS

| | | | | |
|---|---|---|---|---|
| 4,076,539 A | * | 2/1978 | Ikenoue et al. | 430/633 |
| 5,376,516 A | * | 12/1994 | Mochizuki et al. | 430/631 |
| 5,744,295 A | * | 4/1998 | Pitt et al. | 430/527 |

FOREIGN PATENT DOCUMENTS

| | | |
|---|---|---|
| EP | 0 650 088 | 4/1995 |
| EP | 0 769 717 | 4/1997 |
| GB | 1439402 | 6/1976 |
| GB | 2299680 | 10/1996 |
| GB | 2303626 | 2/1997 |

* cited by examiner

*Primary Examiner*—Geraldine Letscher
(74) *Attorney, Agent, or Firm*—Doreen M. Wells

(57) ABSTRACT

A hydrophilic colloid composition having hydrophobic material dispersed therein and comprising an anionic surface active agent further comprises a cationic surface active agent in an amount sufficient to reduce the viscosity of the composition, the cationic surface active agent comprising a hydrophobic moiety, a non-ionic hydrophilic moiety and a cationic hydrophilic moiety.

10 Claims, No Drawings

HYDROPHILIC COLLOID COMPOSITION

FIELD OF THE INVENTION

The present invention relates to a hydrophilic colloid composition e.g. a composition for the coating of a layer in a photographic element.

BACKGROUND OF THE INVENTION

Photographic coating compositions containing aqueous gelatin and high levels of anionic surfactants are prone to exhibit high viscosity, either as simple melts or as more complex melts such as dispersions of relatively hydrophobic materials (e.g. oil) where the anionic surfactant is used as the dispersing aid. In the simple melt case, rheological properties tend to be Newtonian in behaviour. In the disperse system case, systems can be strongly non-Newtonian, exhibiting high viscosity at low shear and low viscosity at high shear. Such properties can adversely affect the transport and coating uniformity of these systems.

The addition of certain cationic or nonionic surfactants to these systems is known to reduce their viscosity and shear thinning behaviour, and can therefore be used to overcome problems of this kind. For example, U.S. Pat. No. 5,300,418 describes the use of specific nonionic surfactants for reducing the viscosity of photographic dispersions. GB-A-2 140 572 describes the use of specific cationic surfactants for reducing the viscosity of photographic dispersions.

Problem to be Solved by the Invention

There is a need for rheology modifiers in the above-mentioned compositions which are much more efficient at reducing low shear viscosity and shear thinning behaviour.

SUMMARY OF THE INVENTION

The invention provides a hydrophilic colloid composition having hydrophobic material dispersed therein and comprising an anionic surface active agent characterised in that the composition further comprises a cationic surface active agent in an amount sufficient to reduce the viscosity of the composition, the cationic surface active agent comprising a hydrophobic moiety, a non-ionic hydrophilic moiety and a cationic hydrophilic moiety.

Advantageous Effect of the Invention

Cationic surfactants containing polyethoxylate groups offer advantages over either cationic or nonionic surfactants as rheology modifiers in the above-mentioned compositions. In the simple melt case, they are more efficient at reducing viscosity than either the nonionic or cationic surfactants, and show better compatibility with the anionic surfactants than basic cationic surfactants insofar as they provide clear solutions as opposed to cloudy or phase-separating systems. In the case of disperse systems, they are much more efficient at reducing low shear viscosity and shear thinning behaviour.

DETAILED DESCRIPTION OF THE INVENTION

The cationic surface active agent used in the composition of the invention as a rheology modifier comprises a hydrophobic moiety, a nonionic hydrophilic moiety and a cationic hydrophilic moiety.

The cationic hydrophilic moiety is preferably a quaternised nitrogen ($N^+$) to which the other moieties are covalently bound.

The nonionic hydrophilic moiety is preferably one or two polyethoxylate groups.

The hydrophobic moiety is preferably a hydrocarbon group.

Preferred cationic surface active agents include compounds having the structure $$R^1L-\underset{(CH_2CH_2O)_mR^3}{\overset{(CH_2CH_2O)_nR^3}{\underset{|}{\overset{|}{N^+}}-R^2}} \quad X^-$$

wherein
- $R^1$ is an alkyl, alkenyl, alkylaryl or arylalkyl chain having from 8 to 20 carbon atoms or a partially or fully fluorinated alkyl, alkenyl, alkylaryl or arylalkyl chain of equivalent hydrophobic strength e.g. having from 4–14 carbon atoms;
- $R^2$ is hydrogen, alkyl having from 1 to 8 carbon atoms e.g. methyl and n-butyl, or benzyl;
- $R^3$ is hydrogen or alkyl having from 1 to 4 carbon atoms e.g. methyl (preferably $R^3$ is hydrogen if the sum of n and m is greater than 0;
- $X^-$ is halide (preferably $Br^-$ or $Cl^-$);
- L represents a suitable linking chemistry between $R^1$ and the positively charged nitrogen e.g. a covalent chemical bond or $-(CH_2CH_2O)_x-$;
- each m and n independently is 0 or an integer such that m+n is 2 to 30, preferably 5 to 30, more preferably 12 to 18 and most preferably 15; and,
- X is an integer from 2 to 30, preferably 5 to 30, more preferably 12 to 18 and most preferably 15.

For preferred structures, L is $-(CH_2CH_2O)_x-$ when m+n is 0, and each m and n independently is greater than 0 when L is other than $-(CH_2CH_2O)_x-$. Preferred compounds include those wherein
- $R^1$ is an alkyl or alkylaryl group having from 10 to 20 carbon atoms;
- $R^2$ is alkyl having from 1 to 4 carbon atoms e.g. methyl and n-butyl;
- $R^3$ is hydrogen;
- L represents a covalent chemical bond; and, m+n is 5 to 30, preferably 15.

Other preferred compounds include those wherein
- $R^1$ is an alkyl or alkylaryl group having from 10 to 20 carbon atoms;
- $R^2$ is alkyl having from 1 to 8, preferably 1 to 4 carbon atoms e.g. methyl and n-butyl;
- $R^3$ is alkyl having from 1 to 4 carbon atoms e.g. methyl;
- each m and n independently is 0;
- L represents $-(CH_2CH_2O)_x-$;
- x is an integer from 5 to 30, preferably 15.

Preferably, the cationic surface active agent is present in the composition in an amount from 0.1 to 0.5, more preferably from 0.2 to 0.4 equivalents relative to the amount of anionic surfactant present in the system.

A preferred hydrophilic colloid is gelatin e.g. alkali-treated gelatin (cattle bone or hide gelatin) and acid-treated gelatin (pigskin or cattle gelatin) or a gelatin derivative e.g. acetylated gelatin and phthalated gelatin. Other suitable hydrophilic colloids include naturally occurring substances such as proteins, protein derivatives, cellulose derivatives e.g. cellulose esters, polysaccharides e.g. dextran, gum arabic, zein, casein and pectin, collagen derivatives, agar-agar, arrowroot and albumin. Examples of suitable synthetic hydrophilic colloids include polyvinyl alcohol, acrylamide polymers, maleic acid copolymers, acrylic acid copolymers, methacrylic acid copolymers and polyalkylene oxides.

The hydrophobic material dispersed in the hydrophilic colloid composition may be any hydrophobic photographic addenda.

A number of hydrophobic photographic additives used in light sensitive photographic materials are oil-soluble and are used by dissolving them in a substantially water-insoluble, high boiling point solvent which is then dispersed in an aqueous hydrophilic colloid solution with the assistance of a dispersing aid. Such oil-soluble additives include image forming dye couplers, dye stabilizers, antioxidants and ultra-violet radiation absorbing agents. A typical solvent used to dissolve the additive is aromatic e.g. di-n-butyl phthalate.

In the following discussion of suitable materials for use in the compositions and materials of this invention, reference will be made to *Research Disclosure*, December, 1989, Item 308119, published by Kenneth Mason Publications, Ltd., Dudley Annex, 12a North Street, Emsworth, Hampshire, P010 7DQ, UK. This publication will be identified hereafter by the term *Research Disclosure*.

Suitable methods of preparing photographic dispersions are described in *Research Disclosure*, Sections XIV A and XIV B. For example, homogenised oil in aqueous gelatin dispersions of photographic couplers can be prepared by dissolving the coupler in a coupler solvent and mechanically dispersing the resulting solution in an aqueous gelatin solution (see U.S. Pat. No. 2,322,027).

Alternatively, microprecipitated dispersions of photographic couplers prepared by solvent and/or pH shift techniques are becoming more widely used (see references: U.K. Patent No. 1,193,349; Research Disclosure 16468, December 1977 pp 75–80; U.S. Ser. No. 288,922 (1988) by K. Chari; U.S. Pat. Nos. 4,970,139 & 5,089,380 by P. Bagchi; U.S. Pat. No. 5,008,179 by K. Chari, W. A. Bowman & B. Thomas; U.S. Pat. No. 5,104,776 by P. Bagchi & S. J. Sargeant) and offer benefits in decreased droplet size and often increased reactivity relative to conventional oil-in-water homogenised dispersions.

Couplers which form cyan dyes upon reaction with oxidized color-developing agents are described in such representative patents and publications as U.S. Pat. Nos. 2,772,162; 2,895,826; 3,002,836; 3,034,892; 2,747,293; 2,423,730; 2,367,531; 3,041,236; and 4,333,999; and Research Disclosure, Section VII D.

Couplers which form magenta dyes upon reaction with oxidized color developing agents are described in such representative patents and publications as: U.S. Pat. Nos. 2,600,788; 2,369,489; 2,343,703; 2,311,082; 3,152,896; 3,519,429; 3,062,653; and 2,908,573; and *Research Disclosure*, Section VII D.

Couplers which form yellow dyes upon reaction with oxidized and color developing agents are described in such representative patents and publications as: U.S. Pat. Nos. 2,875,057; 2,407,210; 3,265,506; 2,298,443; 3,048,194; and 3,447,928; and *Research* Disclosures, Section VII D.

Couplers which form colorless products upon reaction with oxidized color developing agents are described in such representative patents as: UK Patent No. 861,138; U.S. Pat. Nos. 3,632,345; 3,928,041; 3,958,993; and 3,961,959.

The couplers can be dissolved in a solvent and then dispersed in a hydrophilic colloid. Examples of solvents usable for this process include organic solvents having a high boiling point, such as alkyl esters of phthalic acid (for example, dibutyl phthalate, dioctyl phthalate, and the like), phosphoric acid esters (for example, diphenyl phosphate, triphenyl phosphate, tricresyl phosphate, dioctyl butyl phosphate, and the like) citric acid esters (for example, tributyl acetyl citrate, and the like) benzoic acid esters (for example, octyl benzoate, and the like), alkylamides (for example, diethyl laurylamides, and the like), esters of fatty acids (for example dibutoxyethyl succinate, dioctyl azelate, and the like), trimesic acid esters (for example, tributyl trimesate, and the like), or the like; and organic solvents having a boiling point of from about 30° to about 150° C., such as lower alkyl acetates (for example, ethyl acetate, butyl acetate, and the like), ethyl propionate, secondary butyl alcohol, methyl isobutyl ketone, b-ethoxyethyl acetate, methyl cellosolve acetate, or the like. Mixtures of organic solvents having a high boiling point and organic solvents having a low boiling point can also be used.

Suitable anionic surface active agents may be chosen from any known anionic surface active agents. Examples of anionic surface active agents are as follows.

1. Sulphosuccinates having the general structure V(a):

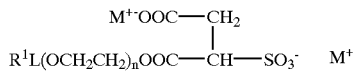

or V(b):

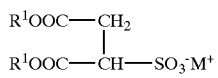

wherein each $R^1$ independently is an alkyl, alkenyl, alkylaryl or arylalkyl chain having from 8 to 20 carbon atoms;

$M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is an integer from 1 to 30.

Examples of compounds having structure V(a) are: Aerosol™ 102 (Cyanamid; n=5, L=covalent bond, $R^1$=a $C_{10}$–$C_{12}$ straight chain alkyl group); Sermul™ EA176 (Servo BV; n=10, L=covalent bond, $R^1$=nonylphenyl).

Examples of compounds having structure V(b) are: Aerosol™ MA (Cyanamid; $R^1$=hexyl); Aerosol™ OT (Cyanamid; $R^1$=2-ethyl-hexyl); and the compound described in U.S. Pat. No. 4,968,599 ($R^1$=n-$C_3F_7CH_2$).

2. Phosphates having the general structure VI:

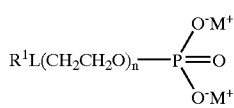

wherein $R^1$ is an alkyl, alkenyl, alkylaryl or arylalkyl chain having from 8 to 20 carbon atoms;

L is a simple linking group such as —O— or a covalent bond;

$M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is an integer from 1 to 30.

Examples of compounds having structure VI are: Sermul™ surfactants EA211, EA188, and EA205 (Servo BV, $R^1$=nonylphenyl, L=—O—, $M^+$=$Na^+$, and n=6, 10, and 50, respectively).

3. Sulphates having the general structure VII:

$$R^1L(OCH_2CH_2)_n-O-SO_3^-M^+$$

wherein $R^1$ is an alkyl, alkenyl, alkylaryl or arylalkyl chain having from 8 to 20 carbon atoms or a fluoroalkyl group having 4 to 14 carbon atoms L is a simple linking group such as —O— or a covalent bond;

$M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is 0 or an integer from 1 to 30.

Examples of compounds having structure VII are: sodium dodecyl sulphate ($R^1$=dodecyl, n=0); Sermul™ surfactants EA54, EA151, EA146 (Servo BV, $R^1$=nonylphenyl, L=covalent bond, $M^+$=$Na^+$ and n=4, 10, and 15, respectively); Polystep™ B23 ($R^1$=dodecyl, and n=10); sulphated derivatives of Brij™ 76 and 78 (ICI, $R1$=$C_{18}H_{37}$ (average), L=covalent bond, and n=10 and 20, respectively).

4. Sulphonates having the general structure VIII:

$$R^1L(OCH_2CH_2)_nSO_3^-M^+$$

wherein $R^1$ is an alkyl, alkenyl, alkylaryl or arylalkyl chain having from 8 to 20 carbon atoms;

L is a simple linking group such as —O— or a covalent bond;

M is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is 0 or an integer from 1 to 30.

Examples of compounds having structure VIII are: Triton™ X-200 (Rohm and Haas, $R^1$=t-octylphenyl, L=covalent bond, n=2–4 nominal and $M^+$=$Na^+$); FT248™ (Bayer, $R^1$=perfluorooctyl, L=covalent bond, n=0 and $M^+$=$N(C_2H_5)_4^+$); and Alkanol XC™ (DuPont, $R^1$=triisopropyl naphthalene, L=covalent bond, n=0 and $M^+$=$Na^+$).

5. Fluorocarboxylates having the general structure IX:

$$R^1COO^-M^+$$

wherein $R^1$ is a fluoroalkyl chain having from 6 to 9 carbon atoms e.g $C_7F_{15}$, $C_8F_{17}$ and $C_9F_{19}$; and, $M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$.

Preferably, the anionic surface active agent is present in the composition in an amount from 0.5 to 2.0, more preferably from 0.7 to 1.2 percent by weight based on the weight of the total system.

In accordance with the invention, a method of preparing a multilayer photographic material comprises (a) simultaneously coating on a support a plurality of aqueous hydrophilic colloid layers including at least one light-sensitive silver halide emulsion layer wherein at least one of the hydrophilic colloid layers comprises a composition according to the invention and, (b) drying the coated layers.

The invention is further illustrated by way of example as follows.

Details of materials used in the specific examples are as follows.

| Structure | Code/Supplier | Structural Details |
|---|---|---|
| Surface active agents | | |
| $\begin{array}{c}(CH_2CH_2O)_mH\\|\\R^1-N^+-R^+\quad X^-\\|\\(CH_2CH_2O)_nH\end{array}$ | Ethoquad C/25<br>Supplier: AKZO Chemie | $R^1$ = coco alkyl ($C_8$ to $C_{18}$ - predominantly $C_{12}$)<br>X = Cl<br>m + n = 15<br>$R^2$ = $CH_3$<br>Type: Ethoxy-cationic |
| $\begin{array}{c}(CH_2CH_2O)_mH\\|\\R^1-N^+-R^+\quad X^-\\|\\(CH_2CH_2O)_nH\end{array}$ | Ethoquad HT/25<br>Supplier: AKZO Chemie | $R^1$ = stearyl alkyl ($C_{12}$ to $C_{20}$ - predominantly $C_{18}$)<br>X = Cl<br>m + n = 15<br>$R^2$ = $CH_3$<br>Type: Ethoxy-cationic |
| $\begin{array}{c}R^3\\|\\R^1(CH_2CH_2O)_{\overline{x}}-N^+-R^2\quad X^-\\|\\R^4\end{array}$ | C18EzDiMeBu<br>UK Patent application 9319790.3 | $R^1$ = $C_{18}H_{37}$, $R^2$ = $C_4H_9$, $R^3$ = $R^4$ = $CH_3$<br>X = Cl<br>x = 15 and 19<br>Type: Ethoxy-cationic |
| $\begin{array}{c}R^3\\|\\R^1(CH_2CH_2O)_{\overline{x}}-N^+-R^2\quad X^-\\|\\R^4\end{array}$ | FC8E10DiMeHx<br>UK Patent application 9319790.3 | $R^1$ = $C_8F_{17}CH_2CH_2$, $R^2$ = $C_6H_{13}$, $R^3$ = $R^4$ = $CH_3$<br>X = Cl<br>x = 10<br>Type: Ethoxy-cationic |

-continued

Surface active agents

| Structure | Code/Supplier | Structural Details |
|---|---|---|
| $R^1\!-\!\overset{\overset{\displaystyle R^3}{\mid}}{\underset{\underset{\displaystyle R^4}{\mid}}{N^+}}\!-\!R^2 \quad X^-$ | Arquad C-50<br>Supplier: AKZO Chemie | $R^1$ = coco alkyl ($C_8$ to $C_{18}$ - predominantly $C_{12}$)<br>$R^2 = R^3 = R^4 = CH_3$<br>$X = Cl$<br>Type: Cationic |
| $R^1\!-\!\overset{\overset{\displaystyle R^3}{\mid}}{\underset{\underset{\displaystyle R^4}{\mid}}{N^+}}\!-\!R^2 \quad X^-$ | DTAB<br>(Dodecyltrimethyl-ammonium bromide)<br>Supplier: Sigma | $R^1$ = n-$C_{12}H_{25}$<br>$R^2 = R^3 = R^4 = CH_3$<br>$X = Br$<br>Type: Cationic |
| $C_{12}H_{25}SO_4Na$<br>sodium dodecyl sulphate | SDS | Type: Anionic |
| Triisopropyl-naphthalene<br>sulphonate, sodium salt | Alkanol XC<br>Supplier: DuPont | Type: Anionic |
| $C_9H_{19}Ph(E)_{15}OSO_3Na$ | Sermul EA146<br>Supplier: Servo-Delden BV | $E = OCH_2CH_2$<br>Type: Ethoxy-anionic |
| $C_9H_{19}Ph(E)_{15}OH$ | Texofor FN15<br>Supplier: Rhodia | $E = OCH_2CH_2$<br>Type: Nonionic |

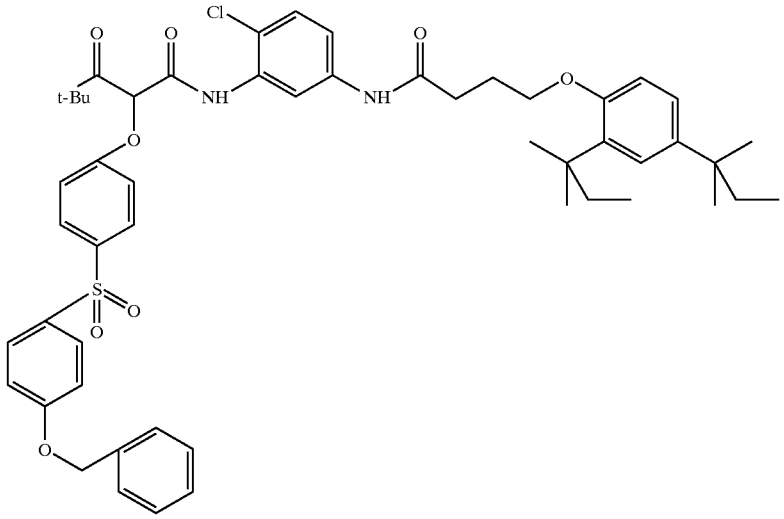

Coupler C1

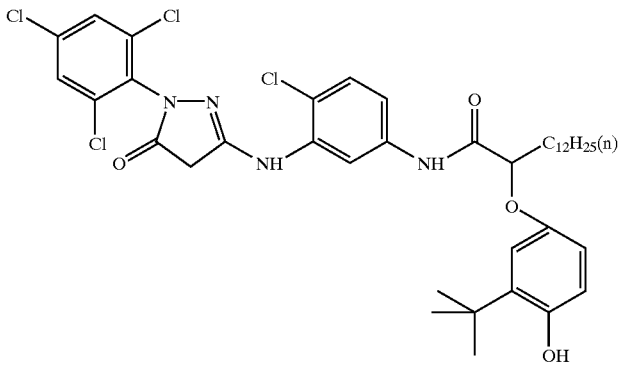

Coupler C2

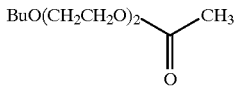

Solvent S1

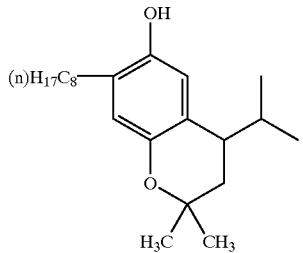

Stabiliser S2

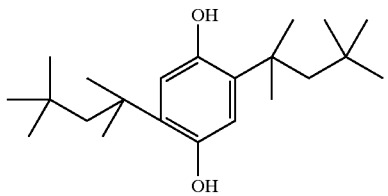

Scavenger S3

Viscosity of Simple Aqueous Gelatin Melts

Anionic surfactants tend to cause large increases in solution viscosity when added to aqueous gelatin melts (solutions) above their critical micelle concentration. This has been well demonstrated for a homologous series of alkyl sulphates (J Greener, B A Contestable, M D Bale, Macromolecules, 20, 2490, (1987)). It is known from the prior art references, that either nonionic or cationic surfactants can be added to such systems to lower the viscosity of the melt to aid their coating or transport. To test the materials of this invention a base standard solution was adopted as a point of reference. The base standard chosen was 1% w/w of the anionic surfactant Alkanol XC in aqueous gelatin solution containing 10% w/w deionised Type IV bone gelatin. This resulted in a base standard solution viscosity of 100 mPa s (at a shear rate of 23 s$^{-1}$) The molarity of the base standard solution was measured to be 23 milli-molar (mM) by Epton titration with hyamine. Other surfactants were then incorporated into individual base standard solutions at two molar levels and the viscosities of the resultant solutions were measured. The molar levels selected were 6.9 mM and 20.7 mM which correspond to 0.3 and 0.9 equivalents wrt the anionic surfactant (Alkanol XC) in the base solution. The results are presented in Table 1.

TABLE 1

Effect of Added Surfactants on Viscosity of Standard Anionic Surfactant/Gelatin Solution

| Sample | Viscosity η/mPa s (shear rate 23 s$^{-1}$) (6.9 mM Surfactant) | Viscosity η/mPa s (shear rate 23 s$^{-1}$) (20.7 mM Surfactant) | Comments (viscosity 10% gelatin alone = 18 mPa s) |
|---|---|---|---|
| Base Standard No Added Surfactant | 100 | 100 | Control: 1% Alkanol XC + 10% Gelatin (w/w) |
| SDS (anionic) | 150 | 220 | Clear solution, increased viscosity Newtonian solutions |
| Texofor FN15 (nonionic) | 56 | 35 | Clear solutions, reduced viscosity Newtonian solutions |
| Sermul EA146 (nonionic/anionic) | 65 | 43 | Clear solutions with reduced viscosity 0.9 equivalents - shear thinning |

TABLE 1-continued

Effect of Added Surfactants on Viscosity of Standard Anionic Surfactant/Gelatin Solution

| Sample | Viscosity η/mPa s (shear rate 23 s$^{-1}$) (6.9 mM Surfactant) | Viscosity η/mPa s (shear rate 23 s$^{-1}$) (20.7 mM Surfactant) | Comments (viscosity 10% gelatin alone = 18 mPa s) |
|---|---|---|---|
| Arquad C-50 (cationic) | 75 | 27 | 0.3 equivalents - slightly cloudy, 0.9 equivalents, - opaque & shear thinning |
| DTAB (cationic) | 78 | 37 | 0.3 equivalents - slightly cloudy, 0.9 equivalents, - opaque & shear thinning |
| Ethoquad C/25 (nonionic/cationic) | 34 | 20 | Clear solution Newtonian |
| Ethoquad HT/25 (nonionic/cationic) | 35 | 18 | Clear solution Newtonian |
| C18E15DiMeBu (nonionic/cationic) | 55 | 25 | Clear solution Newtonian |
| C18E19DiMeBu (nonionic/cationic) | 38 | 23 | Clear solution Newtonian |
| FC8E10DiMeHx nonionic/cationic) | 56 | 28 | Clear solution Newtonian |

Table 1 shows clearly that the nonionic/cationic (ethoxylated cationic) class of surfactant gives certain advantages over the other surfactant classes:

i) They reduce the viscosity of anionic surfactant/gelatin systems more efficiently than the cationic, nonionic or nonionic/anionic (ethoxylated anionic) classes.

ii) As cationic species per se, they reduce viscosity without causing any phase separation (cloudiness), i.e. they show superior compatibility in solution with anionic surfactants than do simple cationics.

The following experimental methods were used to prepare materials used in the Example of the invention:

Preparation of 2 kg Homogenised Dispersion Containing Coupler C1

258 g of coupler C1 was dissolved in a mixture of 65 g di-n-butyl phthalate and 65 g of solvent S1 at 145° C. to make Solution A. 176 g of gelatin was dissolved in 1196 g of water containing 176 g of an aqueous solution of Alkanol XC containing 17.6 g of Alkanol XC and 31 g of propionic acid/sodium propionate preservative to make Solution B. After heating Solution B to 80° C., Solution A was added to Solution B and the whole mixture was immediately homogenised for 5 minutes at 10,000 rpm with a Kinematica Polytron homogeniser fitted with a 35 mm diameter head. The homogenised mixture was then passed twice through a Microfluidics Microfluidiser (model no. 110E) which was run at 10,000 psi pressure and a water bath temperature of 75° C. to give the final dispersion.

Preparation of 1.7 kg Homogenised Dispersion Containing Coupler C2

149 g of coupler C1 was dissolved in a mixture of 58.5 g di-n-butyl phthalate, 22.3 g of solvent S1, 79.1 g of stabiliser S2 and 14.9 g of scavenger S3 at 145° C. to make Solution C. 149 g of gelatin was dissolved in 1032 g of water containing 164 g of an aqueous solution of Alkanol XC containing 16.4 g of Alkanol XC and 32.7 g of propionic acid/sodium propionate preservative to make solution D. After heating Solution D to 80° C., Solution C was added to Solution D and the whole solution was immediately homogenised for 5 minutes at 10,000 rpm with a Kinematica Polytron homogeniser fitted with a 35 mm diameter head. The homogenised mixture was then passed twice through a Microfluidics Microfluidiser (model no. 110E) which was run at 10,000 psi pressure and a water bath temperature of 75° C. to give the final dispersion.

Sample Preparation of Disperse Systems

The total amount of sample prepared was 10 g. This comprised 1 g aqueous surfactant solution and 9 g dispersion. The surfactant solution was prepared by weighing the desired amount of surfactant to give appropriate molar equivalence to the Alkanol XC in the dispersion and making the weight up with water.

The dispersion was heated at 45° C. until it had melted (approximately 20 minutes), then the surfactant solution was added and the mixture was shaken to ensure complete and rapid mixing. The resultant mixtures were heated at 45° C. for a further hour, after which time the flow curve was measured. Throughout, care was taken to ensure no air entered the system.

Measurement of Viscosity

The rheological measurements were made on two computer-controlled rheometers made by Bohlin Instruments, the Bohlin VOR—a controlled-strain rheometer and the Bohlin CS50—a controlled-stress rheometer, both very versatile instruments. The small volume sample cell, C2.3/26 (bob-and-cup geometry), or the double concentric cylinder, DG 24/27 was used for the measurements. Flow curves (viscosity as a function of applied shear) were recorded to ~1000 $s^{-1}$ from stresses of <0.1 Pa.

For the experiments, 2 ml of sample was placed into the cup using a syringe. The bob, which was pre-warmed, was then lowered to the correct position and the sample sheared. A low viscosity silicone oil was placed on top of the sample to prevent formation of a surface film of dried gelatin. A cover was placed the measuring geometry to provide further thermal insulation. The sample was allowed to come to thermal equilibrium for a few minutes before the rheological experiments were performed. There appeared to be no shear-history dependence. All measurements were carried out at 42° C.

EXAMPLE

Viscosity of Disperse Systems

Disperse systems using anionic surfactant/polymer combinations as stabiliser can possess a much higher viscosity than might be expected based on the volume of the dispersed phase. The high viscosity manifests itself at low shear rates as such systems tend to shear thin (reducing viscosity) with increasing shear rate. These effects are due to the dimensions of the adsorbed surfactant/polymer complex around the disperse phase which make the effective volume fraction of the disperse phase much larger than its base value. The greater the degree of dispersion (i.e. the smaller the dispersed droplet/particle), the more pronounced this effect. The property of high viscosity at low shear can make it difficult to pour, pump or de-bubble such systems as these actions are generally performed under conditions of low shear. In coated systems containing high effective volume fractions of disperse phase where viscosities and shear thinning are highly dependent on shear, the cross-width coating uniformity can be very poor. Avoidance of these problems means limiting the loading of the disperse phase which may not be desirable. For instance, limited loading gives the disadvantage that more drying will be necessary to remove solvent i.e. water.

These particular problems are sometimes encountered in photographic systems where hydrophobic particles or droplets are dispersed in an aqueous gelatin medium. An example system is a colour coupler dispersion where the colour coupler is dispersed with solvent in aqueous gelatin. As stated in the previous section, it is known from the Prior Art references that either nonionic or cationic surfactants can be added to such systems to lower the viscosity of the disperse system, and so aid their coating, transport or loading. To compare the materials of this invention with those from the prior art, concentrated solutions of the test surfactants were added to a coupler dispersion in the proportions, 1 part concentrated surfactant to 9 parts colour coupler dispersion. The idea here was to minimise the dilution such that the Theological characteristics of the coupler dispersion were not unduly lost, i.e. to maintain the effective volume fraction of the disperse phase as far as practicable.

Tables 2 and 3 show the results for colour coupler systems C1 and C2 respectively, which like Table 1 compare the added surfactants on equivalent molar bases. In these Tables, the low shear rate viscosity is represented nominally as the limiting Newtonian viscosity ($\eta_0$) as derived from the Cross model—

$$\eta=\eta_\infty+\{\eta_0-\eta_\infty\}/\{1+\lambda\cdot\gamma)^m\}$$

which is one of several that have been put forward to describe the shear thinning between the limiting Newtonian viscosities $\eta_0$ and $\eta_\infty$ at low and high shear rates respectively. $\gamma$ is the shear rate, and $\lambda$ and m are a characteristic time and exponent respectively which describe the thinning behaviour.

TABLE 2

Reduction of Limiting Low Shear Viscosity in Dispersions of Colour Coupler C1 (18.2 mM Alkanol XC)

| Limiting Low Shear Viscosity Surfactant | $\eta_o$ mPa s Surfactant Concentration | | |
|---|---|---|---|
| Type | 3.6 mM | 5.4 mM | 7.2 mM |
| None | 2500 | 2500 | 2500 |
| Ethoquad C/25 (invention) | 600 | 330 | 200 |
| Ethoquad HT/25 (invention) | 590 | 310 | 200 |
| C18E15DiMeBu (invention) | — | 340 | — |
| C18E19DiMeBu (invention) | — | 130 | — |
| FC8E10DiMeHx (invention) | — | 210 | — |
| Arquad C-50 (comparison - cationic) | 850 | 640 | 390 |
| Texofor FN15 (comparison - nonionic) | 1300 | 840 | 440 |

TABLE 3

Reduction of Limiting Low Shear Viscosity in Dispersions of Colour Coupler C2 (19.8 mM Alkanol XC)

| Limiting Low Shear Viscosity Surfactant | $\eta_o$ mPa s Surfactant Concentration | | |
|---|---|---|---|
| Type | 2.0 mM | 5.5 mM | 7.9 mM |
| None | 840 | 840 | 840 |
| Ethoquad C/25 (invention) | 580 | 340 | 190 |
| Ethoquad HT/25 (invention) | 560 | 270 | 180 |
| C18E15DiMeBu (invention) | 410 | 308 | 250 |
| C18E19DiMeBu (invention) | 365 | 285 | 230 |
| FC8E10DiMeHx (invention) | 395 | 300 | 235 |
| Arquad C-50 (comparison - cationic) | 930 | 610 | 400 |
| Texofor FN15 (comparison - nonionic) | 780 | 630 | 520 |

Tables 2 and 3 both demonstrate clearly that the nonionic/cationic (ethoxylated cationic) class of surfactant show advantages in efficiency over the other surfactant classes in terms of reducing the limiting low shear viscosity of disperse systems dispersed with anionic surfactants in a polymer medium such as gelatin.

Addition of these surfactants also serves to reduce shear thinning.

What is claimed is:

1. A hydrophilic colloid composition having hydrophobic material dispersed therein and comprising an anionic surface active agent in the hydrophilic dispersion characterised in that the composition further comprises in that dispersion a cationic surface active agent in an amount sufficient to reduce the viscosity of the composition, the cationic surface active agent comprising a hydrophobic moiety, a non-ionic hydrophilic moiety and a cationic hydrophilic moiety.

2. A composition according to claim 1 wherein the cationic surface active agent has the structure

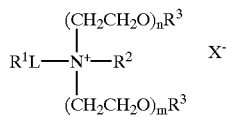

wherein $R^1$ is an alkyl, alkenyl, alkylaryl or arylalkyl chain having from 8 to 20 carbon atoms or a partially or fully fluorinated alkyl, alkenyl, alkylaryl or arylalkyl chain of equivalent hydrophobic strength e.g. having from 4–14 carbon atoms;

$R^2$ is hydrogen, alkyl having from 1 to 8 carbon atoms e.g. methyl and n-butyl, or benzyl;

$R^3$ is hydrogen or alkyl having from 1 to 4 carbon atoms e.g. methyl (preferably $R^3$ is hydrogen if the sum of n and m is greater than 0;

$X^-$ is halide (preferably $Br^-$ or $Cl^-$);

L represents a suitable linking chemistry between $R^1$ and the positively charged nitrogen e.g. a covalent chemical bond or $-(CH_2CH_2O)_x-$;

each m and n independently is 0 or an integer such that m+n is 2 to 30, preferably 5 to 30, more preferably 12 to 18 and most preferably 15; and, x is an integer from 2 to 30, preferably 5 to 30, more preferably 12 to 18 and most preferably 15.

3. A composition according to claim 2 wherein $R^1$ is an alkyl or alkylaryl group having from 10 to 20 carbon atoms;

$R^2$ is alkyl having from 1 to 4 carbon atoms e.g. methyl and n-butyl;

$R^3$ is hydrogen;

L represents a covalent chemical bond; and, m+n is 5 to 30, preferably 15.

4. A composition according to claim 2 wherein $R^1$ is an alkyl or alkylaryl group having from 10 to 20 carbon atoms;

$R^2$ is alkyl having from 1 to 8, preferably 1 to 4 carbon atoms e.g. methyl and n-butyl;

$R^3$ is alkyl having from 1 to 4 carbon atoms e.g. methyl;

each m and n independently is 0;

L represents $-(CH_2CH_2O)_x-$;

x is an integer from 5 to 30, preferably 15.

5. A composition according to claim 1 or 2 wherein the cationic surface active agent is present in the composition in an amount from 0.1 to 0.5 equivalents relative to the amount of anionic surfactant in the system.

6. A composition according to claim 1 or 2 wherein the hydrophilic colloid is gelatin.

7. A composition according to claim 1 or 2 wherein the anionic surface active agent is selected from sulphosuccinates, alkyl ether phosphates, alkyl sulphates, alkyl ether sulphates, alkyl sulphonates, alkyl ether sulphonates, aryl sulphonates and aryl ether sulphonates.

8. A composition according to claim 1 or 2 wherein the anionic surface active agent is present in the composition in an amount from 0.5 to 2.0 percent by weight based on the weight of the total system.

9. A composition according to claim 1 or 2 wherein the hydrophobic material is a photographic coupler.

10. A photographic material comprising a plurality of hydrophilic colloid layers including at least one light sensitive silver halide emulsion layer wherein at least one of the hydrophilic colloid layers is formed from a composition according to any one of the preceding claims.

* * * * *